United States Patent
Ye et al.

(10) Patent No.: US 11,287,010 B2
(45) Date of Patent: Mar. 29, 2022

(54) COMBINED AIR SPRING SYSTEM

(71) Applicant: ZHUZHOU TIMES NEW MATERIAL TECHNOLOGY CO., LTD., Hunan (CN)

(72) Inventors: Te Ye, Hunan (CN); Duomin Nong, Hunan (CN); Canhui Chen, Hunan (CN); Haitao Cheng, Hunan (CN); Jun Zhou, Hunan (CN); Qiang Chen, Hunan (CN); Wenhai Chen, Hunan (CN); Zhuangbing Jin, Hunan (CN); Xuan Peng, Hunan (CN)

(73) Assignee: ZHUZHOU TIMES NEW MATERIAL TECHNOLOGY CO., LTD., Hunan (CN)

( * ) Notice: Subject to any disclaimer, the term of this patent is extended or adjusted under 35 U.S.C. 154(b) by 87 days.

(21) Appl. No.: 16/647,024

(22) PCT Filed: Aug. 2, 2018

(86) PCT No.: PCT/CN2018/098207
§ 371 (c)(1),
(2) Date: Mar. 13, 2020

(87) PCT Pub. No.: WO2019/091148
PCT Pub. Date: May 16, 2019

(65) Prior Publication Data
US 2020/0217390 A1    Jul. 9, 2020

(30) Foreign Application Priority Data
Nov. 13, 2017 (CN) .......................... 201711114465.X

(51) Int. Cl.
*F16F 13/00* (2006.01)
*F16F 9/04* (2006.01)
(Continued)

(52) U.S. Cl.
CPC .......... *F16F 13/002* (2013.01); *F16F 9/0463* (2013.01); *F16F 9/052* (2013.01);
(Continued)

(58) Field of Classification Search
CPC ...... F16F 9/05; F16F 9/052; F16F 9/58; F16F 9/04; F16F 13/002; F16F 9/463;
(Continued)

(56) References Cited

U.S. PATENT DOCUMENTS

2016/0108986 A1* 4/2016 Leonard ................... F16F 9/05
248/565

FOREIGN PATENT DOCUMENTS

| CN | 106662188 | 5/2017 |
|---|---|---|
| CN | 107740835 | 2/2018 |

(Continued)

OTHER PUBLICATIONS

"International Search Report (Form PCT/ISA/210) of PCT/CN2018/098207", dated Nov. 5, 2018, with English translation thereof, pp. 1-4.

*Primary Examiner* — Melanie Torres Williams
(74) *Attorney, Agent, or Firm* — JCIP Global Inc.

(57) ABSTRACT

A combined air spring system includes an upper cover plate, an air bag, an upper end plate and a lower end plate. An outer periphery of the upper cover plate is connected with an outer periphery of the upper end plate through the air bag. A low-position sand clock elastomer is connected between the upper end plate and the lower end plate. A pressing plate is installed at a bottom portion of the upper cover plate, and a high-position elastomer is connected between the upper cover plate and the pressing plate. A limiting table is arranged at a bottom portion of the pressing plate. A limiting
(Continued)

groove is formed in a top face of the upper end plate. The limiting table is located in the limiting groove in a deflated state.

8 Claims, 2 Drawing Sheets

(51) Int. Cl.
*F16F 9/05* (2006.01)
*F16F 9/58* (2006.01)
*F16F 15/023* (2006.01)
*F16F 15/04* (2006.01)

(52) U.S. Cl.
CPC .............. *F16F 9/057* (2013.01); *F16F 9/585* (2013.01); *F16F 15/0232* (2013.01); *F16F 15/046* (2013.01)

(58) Field of Classification Search
CPC ...... F16F 9/585; F16F 15/0232; F16F 15/046; B60G 17/0485
See application file for complete search history.

(56) References Cited

FOREIGN PATENT DOCUMENTS

| DE | 19959842 | A1 | * | 6/2000 | ............. B60G 11/28 |
|---|---|---|---|---|---|
| DE | 202011110308 | U1 | * | 9/2013 | ............. F25B 40/02 |
| EP | 0451749 | | | 10/1991 | |
| JP | 2009156330 | | | 7/2009 | |
| JP | 1855897 | | | 1/2012 | |
| WO | WO-2012054537 | A1 | * | 4/2012 | ............ F16F 9/0472 |
| WO | WO-2013181301 | A1 | * | 12/2013 | ................ F16F 9/56 |

* cited by examiner

COMBINED AIR SPRING SYSTEM

CROSS-REFERENCE TO RELATED APPLICATION

This application is a 371 of international application of PCT application serial no. PCT/CN2018/098207, filed on Aug. 2, 2018, which claims the priority benefit of China application no. 201711114465.X, filed on Nov. 13, 2017. The entirety of each of the above mentioned patent applications is hereby incorporated by reference herein and made a part of this specification.

BACKGROUND

Technical Field

The invention mainly relates to the buffering and damping technology, more particularly relates to a combined air spring system.

Description of Related Art

The air spring assembly is widely applied in railway cars, overload vehicles and other important buffering or damping occasions. Usually, this kind of spring assembly comprises an elastomer located between a pair of rigid end plates. The elastomer is made of rubber, and compressed by loads acted on the spring assembly. In the prior art, the hourglass type secondary spring has lower vertical rigidity at low loads, so the comfort is very good, however, at high loads, the nonlinearity of the hourglass type secondary spring results in great vertical rigidity at high loads, and seriously affects the comfort, while for some heavy haul trains, particularly for double-deck multiple unit trains, the vertical rigidity of the secondary spring is required to be very small at high loads, therefore, the existing hourglass type secondary spring cannot meet this requirement.

SUMMARY

The objects in the invention is in view of the abovementioned problems of the prior art, and provide a combined air spring system which is simple in structure, convenient to install, low in heavy-load vertical rigidity, high in comfort and stability and capable of meeting different limiting interval requirements.

To solve the aforesaid problems, the following technical solutions can be adopted.

A combined air spring system comprises an upper cover plate, an air bag, an upper end plate and a lower end plate. An outer periphery of the upper cover plate is connected with an outer periphery of the upper end plate through the air bag. A low-position hourglass elastomer is connected between the upper end plate and the lower end plate. A pressing plate is installed at a bottom portion of the upper cover plate, and a high-position elastomer is connected between the upper cover plate and the pressing plate. A limiting table is arranged at a bottom portion of the pressing plate. A limiting groove is formed in a top face of the upper end plate. The limiting table is located in the limiting groove in a deflated state.

As further improvement of the above technical solution.

Preferably, the limiting table and the limiting groove both comprise a pair of inclined surfaces and a pair of flat surfaces. The flat surfaces are arranged along a length direction of a vehicle body, and the inclined surfaces are arranged along a width direction of the vehicle body.

Preferably, the bottom portion of the upper cover plate is provided with a stop table outside of the high-position elastomer.

Preferably, a center of the low-position hourglass elastomer is provided with an inner cavity, and a top center of the lower end plate is provided with a stop part extending to the inner cavity.

Preferably, an outer peripheral face of the upper end plate is located outside of the low-position hourglass elastomer.

Preferably, a bottom part of an outer peripheral face of the upper cover plate is provided with a retaining ring. One end of the air bag is fastened with the retaining ring, and the other end of the air bag is in self-sealing connection with the upper end plate.

Preferably, a bottom part of an outer peripheral face of the upper cover plate is provided with a retaining ring. One end of the air bag is fastened with the retaining ring, and the other end of the air bag is in self-sealing connection with the upper end plate.

Compared with the prior art, the invention has the following advantages.

The combined air spring system of the present invention comprises the upper cover plate, the air bag, the upper end plate and the lower end plate. The periphery of the upper cover plate is connected with the periphery of the upper end plate through the air bag. The low-position hourglass elastomer is connected between the upper end plate and the lower end plate. The pressing plate is installed at the bottom portion of the upper cover plate. The high-position elastomer is connected between the upper cover plate and the pressing plate. The limiting table is arranged at the bottom portion of the pressing plate. The limiting groove is formed in the top face of the upper end plate. The limiting table is located in the limiting groove in the deflated state. In this structure, low-position hourglass elastomers and high-position elastomers which are of split type structure form a serial structure which increases the elevation of the elastomer between the upper cover plate and the lower end plate, thereby greatly reducing the heavy-load vertical rigidity of the secondary spring and improving the comfort of the secondary spring at heavy loads. In addition, while the elevation increases, the transverse displacement of the elastomer between the upper cover plate and the lower end plate is also increased. This structure completely isolates the low-position hourglass elastomers from the high-position elastomers through the upper end plate and the pressing plate, so as to avoid the transverse deformation of the secondary spring and improve the stability of the transverse displacement of the secondary spring. In this structure, the upper end plate and the pressing plate are installed without damaging the low-position hourglass elastomer and the high-position elastomer. The structure is simple; it improves installation convenience and ensures the completeness of the low-position hourglass elastomers and the high-position elastomers; the limiting table is located in the limiting groove in the deflated state, the displacement of the upper cover plate in the transverse direction is restricted and limited, in order to solve the different limiting interval requirements for the air spring system in the length and width directions of the vehicle body in the deflated state.

DESCRIPTION OF THE EMBODIMENTS

The present invention will be further clarified based on the following figures and embodiments.

Figure 1:
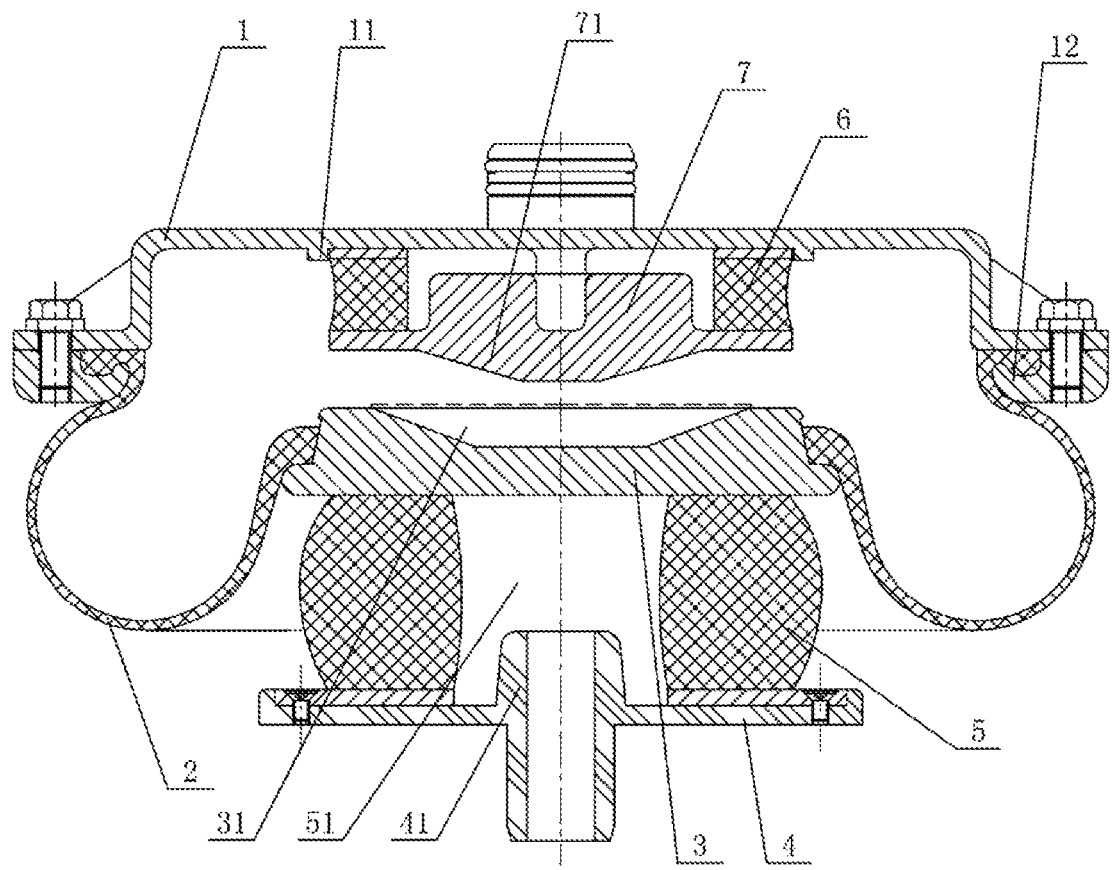
FIG. 1 is a front structural view of the present invention.
Figure 2:
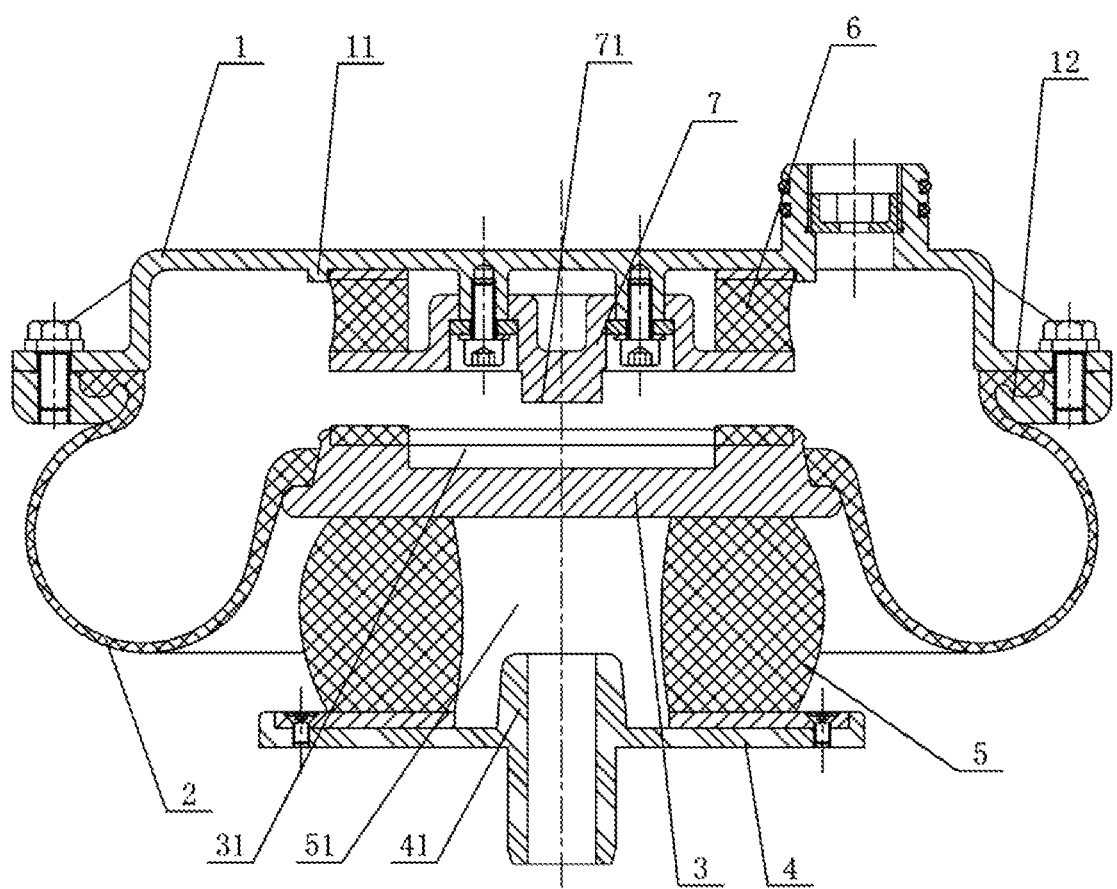
FIG. 2 is a side structural view of the present invention.

As shown in FIG. 1 and FIG. 2, an embodiment of the combined air spring system in the present invention comprises an upper cover plate 1, an air bag 2, an upper end plate 3 and a lower end plate 4. An outer periphery of the upper cover plate 1 is connected with an outer periphery of the upper end plate 3 through the air bag 2. A low-position sand clock elastomer 5 is connected between the upper end plate 3 and the lower end plate 4. A pressing plate 7 is installed at a bottom portion of the upper cover plate 1. A high-position elastomer 6 is connected between the upper cover plate 1 and the pressing plate 7. A limiting table 71 is arranged at a bottom portion of the pressing plate 7. A limiting groove 31 is formed in a top face of the upper end plate 3. The limiting table 71 is located in the limiting groove 31 in a deflated state. In this structure, low-position hourglass elastomers 5 and high-position elastomers 6 which are of split type structure form a serial structure, which increases the elevation of the elastomer between the upper cover plate 1 and the lower end plate 4, thereby greatly reducing the heavy-load vertical rigidity of the secondary spring and improving the comfort of the secondary spring at heavy loads. In addition, while the elevation increases, the transverse displacement of the elastomer between the upper cover plate 1 and the lower end plate 4 is also increased. In this structure, the low-position hourglass elastomers 5 is completely isolated from the high-position elastomers 6 through the upper end plate 3 and the pressing plate 7, so as to avoid the transverse deformation of the secondary spring and improve the stability of the transverse displacement of the secondary spring; in this structure, the upper end plate 3 and the pressing plate 7 are installed without damaging the low-position hourglass elastomer 5 and the high-position elastomer 6. The structure is simple; it improves installation convenience and ensures the completeness of the low-position hourglass elastomers 5 and the high-position elastomers 6. The limiting table 71 is located in the limiting groove 31 in the deflated state, and the displacement of the upper cover plate 1 in the transverse direction is restricted and limited, in order to solve the different limiting interval requirements for the air spring system in the length and width directions of the vehicle body in the deflated state.

In this embodiment, the limiting table 71 and the limiting groove 31 both comprise a pair of inclined surfaces and a pair of flat surfaces. The flat surfaces are arranged along a length direction of a vehicle body, and the inclined surfaces are arranged along a width direction of the vehicle body. Such setting makes the limiting interval of the vehicle body in the length direction greater than that of the vehicle body in the width direction, in order to adapt to the movement inertia of the vehicle body and prevent the vehicle body moving left and right too much.

In this embodiment, the bottom portion of the upper cover plate 1 is provided with a stop table 11 outside of the high-position elastomer 6. The stop table 11 restricts and limits the transverse displacement of the high-position elastomer 6, in order to prevent transverse deformation.

In this embodiment, a center of the low-position hourglass elastomer 5 is provided with an inner cavity 51, and a top center of the lower end plate 4 is provided with a stop part 41 extending to the inner cavity 51. The stop part 41 ensures the overall settlement of the vehicle and keeps no interference between the vehicle body and the bogie at high loads and dynamic loads, etc.

In this embodiment, an outer peripheral face of the upper end plate 3 is located outside of the low-position hourglass elastomer 5. Such setting makes the upper end plate 3 integrally extends to the outside of the low-position hourglass elastomer 5, convenient for installation.

In this embodiment, a bottom part of an peripheral face of the upper cover plate 1 is provided with a retaining ring 12. One end of the air bag 2 is buckled with the retaining ring 12, and the other end of the air bag 2 is connected with the upper end plate 3. In this structure, the small opening of the air bag 2 is in self-sealing connection with the lower end plate 3, to prevent air leakage.

While the preferred embodiments of the present invention have been disclosed as above, they are not intended to limit the present invention. Any person skilled in the art, without departing from the scope of the technical solution of the present invention, can take advantage of the above-described technical content to make many possible variations and modifications of the present invention, or equivalent embodiments with equivalent change. Therefore, all the contents without departing from the technical solution of the present invention, based on any simple modification, equivalent variations and modifications of the present invention made by the technical essence of the present invention for the above embodiment, would fall within the protection scope of the technical solution of the present invention.

What is claimed is:

1. A combined air spring system, comprising an upper cover plate, an air bag, an upper end plate and a lower end plate, wherein an outer periphery of the upper cover plate is connected with an outer periphery of the upper end plate through the air bag; a low-position hourglass elastomer is connected between the upper end plate and the lower end plate; a pressing plate is installed at a bottom portion of the upper cover plate; a high-position elastomer is connected between the upper cover plate and the pressing plate; a limiting table is arranged at a bottom portion of the pressing plate; a limiting groove is formed in a top face of the upper end plate; the limiting table is located in the limiting groove in a deflated state,
wherein a center of the low-position hourglass elastomer is provided with an inner cavity penetrating through top and bottom surfaces of the low-position hourglass elastomer, and a top center of the lower end plate is provided with a stop part extending into the inner cavity.

2. The combined air spring system according to claim 1, wherein the limiting table and the limiting groove both comprise a pair of inclined surfaces and a pair of flat surfaces; the flat surfaces are arranged along a length direction of a vehicle body, and the inclined surfaces are arranged along a width direction of the vehicle body.

3. The combined air spring system according to claim 2, wherein the bottom portion of the upper cover plate is provided with a stop table outside of the high-position elastomer.

4. The combined air spring system according to claim 1, wherein an outer peripheral face of the upper end plate is located outside of the low-position hourglass elastomer.

5. The combined air spring system according to claim 1, wherein a bottom part of an outer peripheral face of the upper cover plate is provided with a retaining ring; one end of the air bag is buckled with the retaining ring, and the other end of the air bag is in self-sealing connection with the upper end plate.

6. The combined air spring system according to claim 4, wherein a bottom part of an outer peripheral face of the upper cover plate is provided with a retaining ring; one end of the air bag is buckled with the retaining ring, and the other end of the air bag is in self-sealing connection with the upper end plate.

7. The combined air spring system according to claim 2, wherein a bottom part of an outer peripheral face of the upper cover plate is provided with a retaining ring; one end of the air bag is buckled with the retaining ring, and the other end of the air bag is in self-sealing connection with the upper end plate.

8. The combined air spring system according to claim 3, wherein a bottom part of an outer peripheral face of the upper cover plate is provided with a retaining ring; one end of the air bag is buckled with the retaining ring, and the other end of the air bag is in self-sealing connection with the upper end plate.

\* \* \* \* \*